Dec. 4, 1962 G. E. HOLLAR 3,066,986
WHEEL DISC RETAINING MEANS
Filed Aug. 5, 1959

George E. Hollar
INVENTOR.

BY
*Attorneys*

United States Patent Office 3,066,986
Patented Dec. 4, 1962

---

3,066,986
WHEEL DISC RETAINING MEANS
George E. Hollar, Box 952, Quincy, Wash.
Filed Aug. 5, 1959, Ser. No. 831,798
2 Claims. (Cl. 301—37)

This invention relates generally to automotive equipment and more particularly to wheel discs and hub caps and means for retaining the discs on a wheel.

Most motorists will recall times at which hub caps were lost while driving because the spring retention means were ineffective or the hub caps were not replaced properly after removal. Also, motorists will recall times at which they found hub caps of an automobile missing after leaving the vehicle parked overnight. Inasmuch as many hub caps and wheel discs are lost through mechanical failure and thievery, the invention herein discloses novel means for securing wheel discs or hub caps to a vehicle wheel to prevent loss thereof due to failure of the spring retention means and to discourage thievery thereof.

It is a further object of this invention to provide novel means for retaining a wheel disc or hub cap on an automobile wheel while allowing the wheel disc or hub cap to be removed from the wheel without removing the wheel or loosening the bolts securing the wheel to the axle or hub.

It is a further object of this invention to provide means for retaining a wheel disc or hub cap on an automobile wheel which requires that only minor modifications be made to the disc and auto.

In accordance with the above stated objects, below is particularly described the structural features and method of utilization of the retaining means for securing the wheel disc to a wheel. Initially, radial support bars are supported on the wheel disc at points along the circumference thereof. An opening is formed in the disc and aligned with an aperture in the support bars. The opening and aperture are aligned with the central axis of the wheel disc and also with a threaded stud extending from a rotatable member upon which the wheel is supported. In connection with the front wheels of an automobile, the threaded stud is secured to the dust cap while in connection with the rear wheels, the threaded stud is secured to the axle. The stud extends through the aperture in the support bars and receives a nut thereon for securing the support bars to the rotatable member. The opening formed in the wheel disc provides access to the nut for allowing it to be removed to allow the wheel disc to be removed from the wheel. A cap is provided for being detachably received within the wheel disc opening to seal the opening.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
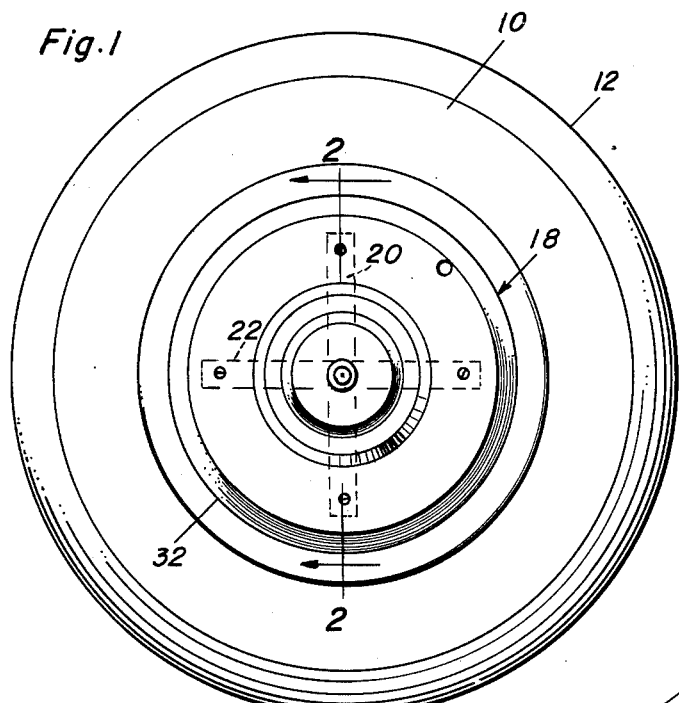
FIGURE 1 is an elevational front view of the wheel disc secured to a wheel.
Figure 2:
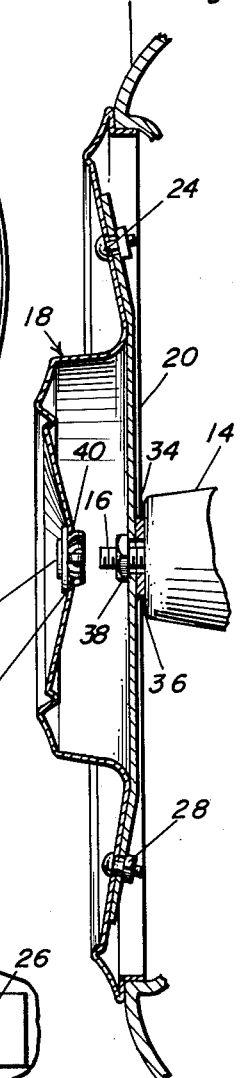
FIGURE 2 is an enlarged sectional view taken substantially along the plane 2—2 of FIGURE 1.

With continuing reference to the drawings, numeral 10 indicates a wheel of an automobile or such having a tire 12 fixed thereon. A rotatable member 14 which may be the dust cap if 10 represents the front wheel or the axle if 10 represents the rear wheel has a threaded stud 16 aligned therewith and fixed thereto.

It is desired to secure the wheel disc or hub cap 18 to the wheel 10. Accordingly, support bars 20 and 22 are radially or diagonally supported on the inside of the wheel disc or hub cap 18 by nut and bolt combinations 24, 26, 28 and 30 adjacent the circumferential edge 32 of the wheel disc or hub cap 18.

Figure 3:
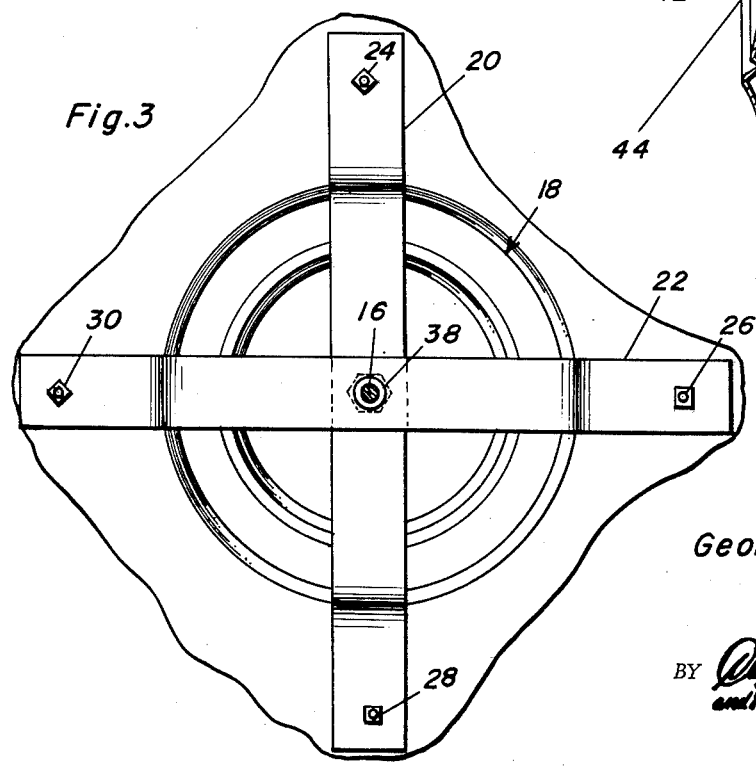
FIGURE 3 is an enlarged fragmentary rear elevational view of the supporting bars secured to a wheel disc.

The support bars 20 and 22 intersect coincident with the central axis of the wheel disc or hub cap 18 and are superposed as illustrated in FIGURE 3. An aperture 34 is formed in the superposed support bars 20 and 22. In order to affix the wheel disc or hub cap 18 to the wheel 10, the threaded stud 16 is extended through the aperture 34 with a washer 36 included therebetween. A nut 38 is threadedly engaged with the threaded stud 16 and secures the support bars 20 and 22 to the rotatable member 14.

In order to gain access to the nut 38 securing the wheel disc or hub cap 18 to the wheel 10, a central opening 40 is formed in the wheel disc or hub cap 18 aligned with the central axis thereof. A cap 42 having a plurality of resilient legs 44 is received within the opening 40 to seal the opening, principally for appearance sake.

In the operation and utilization of the invention, when it is desired to remove the wheel disc or hub cap 18 from the wheel 10, the cap 42 may simply be removed from the wheel disc or hub cap 18 by pulling outwardly therefrom. Access is therefore provided to the nut 38 threadedly engaged with the threaded stud 16. When the nut 38 is removed, the support bars 20 and 22 are free to be withdrawn from the rotatable member 14. If it then be desired to remove the wheel, as for the purpose of changing a flat tire, the conventional retaining bolts or nuts may be removed in the well known manner.

Though it is appreciated that the prior art anticipates the broad idea of securing means for a wheel disc or hub cap, the invention is advantageous inasmuch as it is unnecessary to loosen the conventional nuts or bolts securing the wheel to the hub or axle in order to remove the wheel disc or hub cap. By utilizing the teachings of the present invention, a person wishing to change a flat tire, may very easily perform the chore with the only increased effort being that of removing the nut 38 from the threaded stud 16. In all other respects, the removal of the wheel 10 is similar to the procedure conventionally followed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. The combination of a rotatably mounted vehicle wheel having an outer side which includes a peripheral rim projecting axially outwardly from said side, a member secured to the outer side of the wheel and concentric therewith, said member being rotatable with said wheel, a wheel cover covering said member and said outer side, first means releasably securing the outer periphery of the cover to said rim, safety and theft prevention means releasably securing said cover to said member and concealed between said wheel and said cover, said cover being provided with an access opening adjacent said safety and theft prevent means, a closure member extending over said access opening and detachably secured to said wheel cover, said wheel cover being generally radially extending and provided with an outwardly projecting central portion, said first means including an axially inwardly projecting peripheral flange on the cover telescoped within said rim and frictionally engaging same, said safety and theft prevent means including a support bar secured at its ends to the inner surface of the wheel cover, the central portion of said bar being spaced from the central portion of the cover and provided with an aperture, a threaded stud secured to said member and extending through said aperture, a nut threaded on the outer end of said stud and engaging said bar.

2. The combination of claim 1 wherein said member comprises a conventional dust cap.

References Cited in the file of this patent

UNITED STATES PATENTS

| | | |
|---|---|---|
| 1,893,334 | Miller | Jan. 3, 1933 |
| 1,979,895 | Maker | Nov. 6, 1934 |
| 2,387,188 | Spingler | Oct. 16, 1945 |
| 2,443,760 | Arrison | June 22, 1948 |
| 2,725,257 | Maurer et al. | Nov. 29, 1955 |
| 2,754,154 | Solow | July 10, 1956 |
| 2,935,361 | Aske | May 3, 1960 |
| 2,971,798 | Lyon | Feb. 14, 1961 |